May 9, 1967 M. BAR 3,319,171

ANALOG STORAGE AND READOUT SYSTEM

Filed Oct. 5, 1964

INVENTOR
MEYER BAR

BY

Sidney Magnes
AGENT 3,319,171
Patented May 9, 1967

3,319,171

ANALOG STORAGE AND READOUT SYSTEM

Meyer Bar, Palos Verdes Peninsula, Calif., assignor to North American Aviation, Inc.

Filed Oct. 5, 1964, Ser. No. 401,463
12 Claims. (Cl. 328—124)

This invention relates to a storage and readout system; and more particularly to an arrangement for storing and reading out analog signals.

*Background*

As is well known, it is frequently necessary to store information, and to later read out the stored information. This storage and readout may be done in a number of ways—ranging from a notebook, through means such as punched cards, to electronic circuitry. There is an ever-increasing need for electronic storage and readout, since this method permits practically instantaneous storage of extremely complex information, storage for appreciable periods of time, and rapid high-fidelity readout of the stored information.

Electronic storage of information has taken two general forms. The first of these is known as the "digital" system, wherein information is stored in the form of discrete "bits" of information, such as holes in a punched card—the holes representing samples of the changes of a characteristic, such as temperature or some transient condition; the discrete bits of information being a digital storage. The disadvantage of digital storage is that it is discontinuous; that is, it is extremely difficult to know what happened between consecutive bits of stored information.

The other method of electronic storage of information is known as an "analog" system, wherein information is stored in the form of a graph, which may represent the continuous changes of a characteristic, such as temperature or a transient condition; the continuous recording being an analog storage. In the past, the main disadvantage of the analog storage system has been the difficulty of analog readout.

An example will clarify the difference between these two storage systems. Suppose an engine is being tested, and it is desired to store—for later analysis—the stresses due to vibration, these stresses varying in an erratic manner. Due to its inherent characteristics, the digital storage system would store a series of discrete stress readings taken an instant apart; and later these discrete readings would be readout as digital electrical signals for use in a computer. Unfortunately, the resultant signals would not indicate the stress values between the discrete readings.

On the other hand, the analog system would store the continuous variations of the stress, but unfortunately—with prior-art systems—these variations have been difficult to readout in the form of continuous analog electrical signals.

*Objects and drawings*

It is therefore an object of the present invention to provide an improved storage and readout system.

The attainment of this object and others will be realized from the following specification, taken in conjunction with the drawings, of which:

*Introduction*

Figure 1:
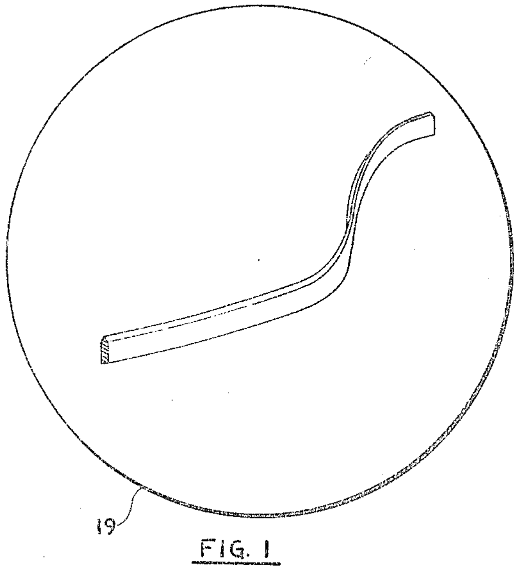
FIG. 1 shows a representation of a potential ridge.

There is presently available a number of devices known as storage-tubes, one of these being model CK7575/

QK787 made by the Industrial Tube Division of the Raytheon Company of Newton, Mass. This storage-tube, and others of this general type, comprise an evacuated container having a device that produces a stream of electrons that is focussed into a fine beam; a deflection system being capable of receiving signals that deflect the electron stream in a vertical and in a horizontal direction. Thus, by means of suitable simultaneous voltages applied to the horizontal deflection portion and vertical deflection portion of the deflection system, the electron stream may be moved in any desired manner, or positioned at any desired location. Generally, a positive horizontal deflection voltage moves the electron stream to the right, and a positive vertical deflection voltage moves the electron stream upwards.

All storage tubes contain a so-called "storage" element that operates as follows. The electron stream is first operated in such a way as to produce low-velocity electrons, and is deflected in such a manner as to "flood" the storage element—so that each portion of the storage element is at the same electrical potential. Then, in order to "write" the information to be stored, the electron stream is operated in such a way that it comprises high-velocity electrons that impinge on the storage element, and change the electrical characteristic of the storage element at the point of electron-stream impingement. It should be noted that, in most storage elements, the change in electrical characteristics utilizes the phenomenon known as secondary-emission; this phenomenon being one whereby the action of the high-velocity electron stream drives "secondary" electrons from the electron-stream impingement-area of the formerly uniform-electrical-potential storage element. The impingement-area, due to the escape of its electrons, is now positively-charged; i.e., it has a positive voltage, or "potential." It will be remembered that the electron stream may be deflected to strike any desired portion of the storage element; and, by use of suitable deflection voltages, the electron beam writes on the storage element, the information to be stored taking the form of a graph of small juxtaposed positively-charged areas. This stored graph is actually a potential gradient between the positively-charged written areas and the uniformly-negatively-charged unwritten areas, and may be visualized as a mountain ridge that projects from a plain; the "height" of the ridge corresponding to the positive charge produced by the aforementioned secondary-emission characteristic. The writing operation is such that this positively-charged potential ridge has a constant maximum value, and will remain indefinitely; this being the storage aspect of the tube. It should be noted that the stored pattern, or graph, is continuous, and is thus an analog storage system wherein horizontal and vertical positions of the stored pattern or graph represent the desired information.

The storage tube is read out to produce electrical output signals by modifying the operation of the electron stream to a "reading" mode. Most prior-art reading modes caused the electron stream to sweep sequentially across adjacent portions of the potential ridge, the storage tube producing an output signal each time that the electron beam sweeps across the potential ridge. This type of readout, however, is digital rather than analog, since it is no longer continuous.

*Summary*

Broadly speaking, the present invention contemplates a storage and readout system wherein the reading electron stream follows the potential ridge of the storage-tube, the system producing a continuous output signal that indicates the position of the electron stream at all times. Since the electron stream follows the stored pattern potential ridge, the voltage that positions the electron beam is therefore an analog signal corresponding to the stored analog information.

*Description of the invention*

The potential ridge may be visualized from FIG. 1, wherein the height of the ridge represents the potential produced by the secondary-emission characteristic previously described; the potential dropping off on either side of the potential ridge's spine.

In the following explanation, it will be assumed that the maximum potential of the potential ridge is five volts, and that some intermediate level represents a four-volt line; and it will be seen from the following explanation that the electron stream reads out the stored information by following the four-volt line of the potential ridge.

Figure 2:
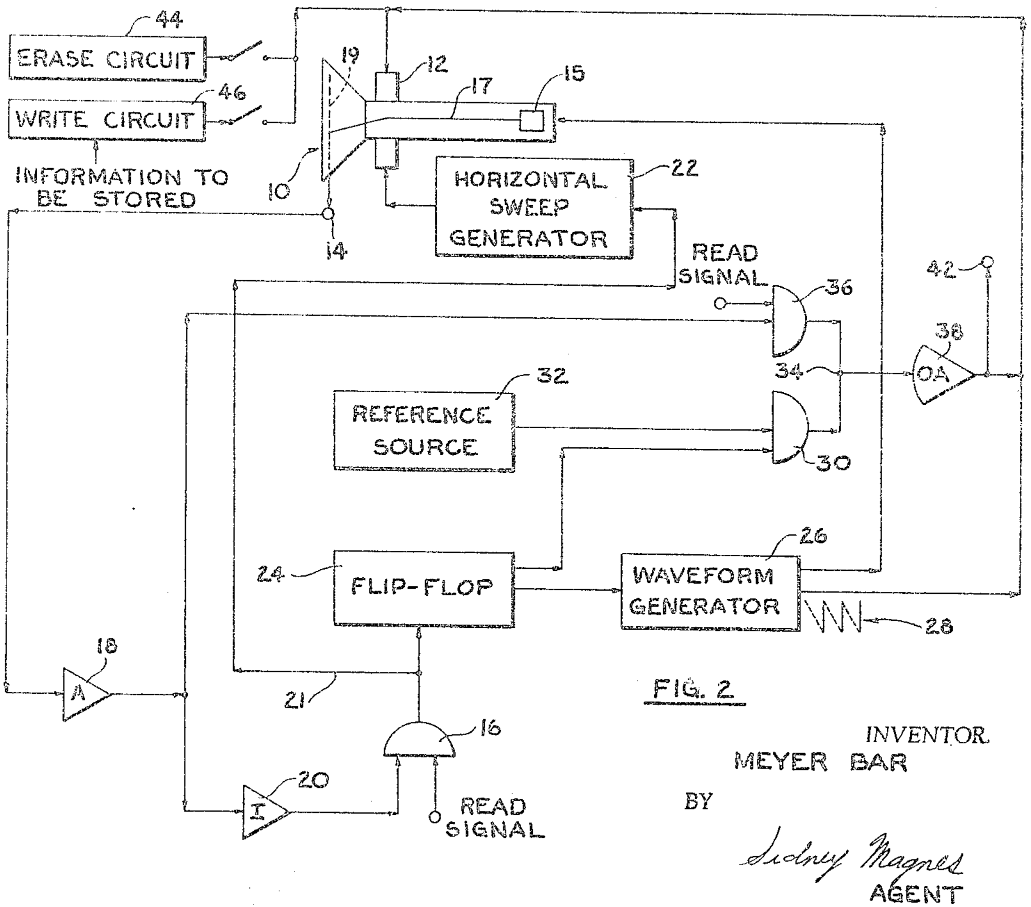
FIG. 2 is a block diagram of one embodiment of the invention.

With the concept of the potential ridge in mind, attention is now directed to FIG. 2, which shows an embodiment of the invention. Here a storage-tube 10 is shown to have a deflection system 12 and an output connection 14. An electron-gun 15 produces an electron stream 17, which is deflected by deflection system 12, to impinge on a storage element 19. The other connections to the storage-tube are well known, and therefore are not illustrated. In accordance with the previously-described operation, the information to be stored is applied to deflection system 12 in the form of an input signal, and is stored as previously described as a potential ridge on storage element 19.

In order to readout the stored information, which is stored as a potential ridge on the storage element of the storage-tube, a sequence of operations—search, lock-on, and read—is initiated by applying a "read" signal to various portions of the circuit.

*The search mode*

The search mode operates as follows. The read-signal is applied—among other places—to a "starting" gate circuit 16, it being known that a gate circuit must have its gating signal present in order to transmit its primary signal. The starting gate circuit 16 requires a gating signal—which is the read-signal—and a primary signal, shown in FIG. 2 as a signal from an inverter 20.

The signal from inverter 20 is obtained as follows. It will be noted in FIG. 2 that the storage-tube output terminal 14 is connected to an output-amplifier 18, and that part of the output-amplifier signal is applied to inverter 20. The inherent operation of inverter 20 is such that in the presence of a storage-tube output signal, inverter 20 does not have an output—whereas in the absence of a storage-tube output signal, inverter 20 does produce an ouput.

It will be recognized that at the instant of readout-initiation, storage-tube 10 is not producing an output signal, so that there is an output from inverter 20. Thus, at readout-initiation, starting gate circuit 16 has its gating signal—the read signal, and has its primary signal—the signal from inverter 20; so that it produces an output "start" signal, this start signal being applied to two places. First of all, the start signal from start gate circuit 16 traverses a wire 21, and triggers a horizontal-sweep-generator 22 that applies a sawtooth-type horizontal deflection signal to deflection circuit 12; this horizontal deflection signal causing the electron stream to move horizontally from its quiescent location at the lower left-hand corner of the storage element.

The output signal from starting gate 16 is also applied to a flip-flop circuit 24, whose output is in turn applied to two places. The first of these is a waveform-generating circuit 26, whose output is a sawtooth-waveform 28 whose solid-line positive-going portion is applied through a suitably-poled diode to the deflection-system 12; the positive-going portion of waveform 28 causing the electron stream to be deflected upwardly from its quiescent location at the lower left-hand corner of the storage element, in order to search for the potential ridge. The dotted-line negative-going portion of waveform 28 is applied through a suitably-poled diode to the electron-stream-cutoff circuit of the storage-tube 10, as indicated.

To recapitulate, the read-signal first initiates a search, wherein the electron stream is deflected upwardly by a positive-going portion of waveform 28, and to the right by the output of horizontal-sweep-generator 22; the electron stream thus moving upward and to the right from its quiescent location at the lower left-hand corner of the storage-element. During this search interval the electron stream will cross the potential ridge on the storage-element. If it does not, the upward-to-the-right search pattern is repeated by the positive-going portions of waveform 28 and the output of the horizontal-sweep-generator 22, so that the electron stream scans the storage-surface in a series of steeply-sloped parallel lines, until it finds the potential ridge.

For reasons to be discussed later, it is desirable that the potential ridge be found by an upward-moving electron stream. This result is achieved by causing the negative-going portion of waveform 28 to cut off the electron stream as described above, thus suppressing the electron-beam during the interval in which it might have a downward movement. Thus, the electron beam searches for, and finds, the potential ridge during an upward movement.

*The lock-on mode*

Once the electron stream finds potential ridge, the search mode is terminated as follows. As soon as the electron beam impinges onto the potential ridge, the storage-tube produces an output signal at output terminal 14 as previously described; and this output signal is applied through output-amplifier 18 to inverter 20. As previously explained, as soon as a signal is applied to inverter 20, the inverter's output signal is terminated, so that the inverter no longer applies a signal to gate 16—which thereupon terminates the signal applied to flip-flop 24. Flip-flop 24 thereupon resets itself, and terminates its output to waveform-generating circuit 26, which thereupon terminates waveform 28. As a result, the electron beam is no longer deflected upwardly, and it comes to rest on the potential ridge. In this way the electron beam searches for, and finds, the potential ridge; and terminates the search mode.

As soon as the electron beam finds the potential ridge, it is locked on, as will be understood from the following explanation; a slight digression being necessary to clarify some circuit details.

Attention is now directed to "reference" gate circuit 30, which also requires a gating signal in order to transmit its primary signal, the primary signal being a reference-voltage—typically (−4 volts—that a reference source 32 is continuously applying to gate circuit 30.

The gating signal is obtained from flip-flop 24. It is well known that a flip-flop is capable of providing two output signals having opposite polarities. Thus, during the search mode of operation, the flip-flop 24 was applying a positive signal that activated waveform-generator 26; but it was also applying a negative signal that prevented reference gate circuit 30 from producing an output signal. However, at the end of the search mode, flip-flop 24 resets itself to terminate the signal to waveform-generator 26, and this resetting inherently changes the polarity of the signal it applies to reference gate 30; the gating signal changing from a negative polarity to a positive polarity. Thus, at the end of the search mode, reference gate 30 receives a positive gating signal from flip-flop 24. Thus, when the electron beam finds the potential ridge, reference gate 30 transmits the −4-volt reference voltage to point 34.

Attention is now directed to "readout" gate circuit 36. It will be noted that this gate also requires one gating signal. At the previously discussed instant of initiation, the read-signal was applied to circuit 36, so that the read-signal acts as the gating signal; the primary signal being obtained from the output terminal 14 of the storage-tube. At the instant of initiation, and for the duration of the search mode, there was no storage-tube output signal, so readout gate 36 did not produce any output signal. Now though, at the instant that the electron beam finds the potential ridge, there is a storage-tube output signal, and this signal is applied to circuit 36. Since both of its necessary signals are now present, the read-signal being applied throughout the read interval, readout gate 36 transmits the storage-tube output signal to point 34.

To recapitulate, during the search mode no signal is applied to point 34; but at the instant that the electron beam finds the potential ridge, point 34 receives the storage-tube output signal and the −4-volt reference signal. Either or both of the storage output signal and the reference signals have their magnitudes modified so as to enable the desired comparison.

Assume for the moment that the potential ridge happened to be at the zero vertical position of the storage element; that is, at the position that the electron beam would strike when a zero deflection voltage was applied to the vertical portion of the deflection system. Assume further that the electron beam happened to stop at the +4-volt level of the potential ridge when search waveform 28 was terminated. The latter condition means that, at point 34, +4 volts—from the +4-volt level of the potential ridge—is applied by readout gate 36, and that −4 volts—from the reference source 32—is applied by reference gate 30; these two opposite-polarity voltages cancelling each other at summation point 34, to produce an "error" voltage of zero volts at point 34.

Summation point 34 is the input terminal of a so-called "operational amplifier" 38, which is described in a number of publications, such as "Analog Methods," by Karplus and Soroka, page 34, et seq. Briefly stated, an operational-amplifier is an extremely high-gain amplifier, its output being of the opposite polarity compared with its input; that is if the input should increase by a very slight amount, the output decreases by a very large amount. The output is fed back to cancel the change at the input. Due to the extremely high gain, the cancellation is extremely effective, so that the net result is that any change at the input is immediately compensated for. Thus, the input remains at substantially the same potential at all times.

Continuing the explanation of the invention's operation, it was pointed out that if the electron beam happened to stop at the +4-volt level of the potential ridge, the summation point 34 had an error voltage of zero volts. The operational-amplifier 38 therefore produces an output of zero volts, which is passed to the vertical deflection portion of deflection circuit 12. Since a zero voltage is fed to the vertical portion of the deflection system, it positions the electron beam at the zero position of the storage element. Since this is where the potential ridge was assumed to be when it was found by the electron beam, the zero-valued positioning voltage from the operational amplifier locks the electron beam onto the +4-volt level of the potential ridge—which is the location at which the search waveform 28 had left it when the latter was terminated upon location of the potential ridge.

Assume now, that instead of the electron beam stopping at the +4-volt level of the potential ridge as a result of the search operation, it actually rode only part way up the potential ridge, and stopped at the +3.5-volt level. In accordance with the previous explanation, this +3.5-volt output of the storage-tube is transmitted through readout gate 36, and appears at point 34. Since reference gate 30 continues to apply −4 volts to point 34, whereas the readout gate 36 applies +3.5 volts to point 34, point 34 therefore sees an error voltage that is the difference between these two voltages, the error voltage being −0.5 volt—which is applied to operational amplifier 38. In accordance with the explanation previously given, the −0.5-volt error signal applied to operational amplifier 38 now produces a large positive positioning voltage at its output; and this positive positioning voltage is applied to the vertical deflection portion of the vertical deflection system 12—where it moves the electron beam upward. As the electron beam moves upward, it climbs higher onto the potential ridge, and sees a higher voltage level—say +3.75 volts. This +3.75 volts is applied to point 34, where the −0.25 volt difference between the −4-volt reference-voltage and the +3.75 voltage causes the operational amplifier to produce a somewhat smaller positive positioning voltage, that is in turn applied to the vertical portion of deflection system 12. As previously explained, this positive deflection voltage causes the electron beam to move upward at a somewhat slower rate; and this procedure is repeated until the error voltage becomes zero, and the positioning voltage from the operational amplifier becomes zero; the electron beam finally comes to rest at the +4-volt level of the potential ridge.

To recapitulate, when the electron beam found the potential ridge, and stopped below +4-volt level, the circuitry of FIG. 2 caused the electron beam to move upward until it came to rest at the +4-volt level of the potential ridge.

A similar situation arises if the search operation causes electron beam to overshoot the +4-volt level of the potential ridge, and stop at the +4.5-volt level. Under this condition, point 34 receives the −4-volt reference voltage from reference gate 30, and receives the actual +4.5-volt readout from readout gate 36; the result being that a +0.5-volt error voltage is applied to operational-amplifier 38. Since the inherent operation of the operational-amplifier is to produce an output signal of the opposite polarity, the output is a large negative positioning voltage, which is applied to the vertical deflection portion of deflection system 12 to cause the electron beam to move downward, so that it leaves the +4.5 level of the potential ridge, and moves toward the+4-volt level. As previously explained, it eventually comes to rest at the +4-volt level of the potential ridge.

To recapitulate, the disclosed circuitry causes the electron beam to lock onto the +4-volt level of the lower half of the potential ridge; the +4-volt level being chosen merely for explanatory purposes, and the use of the lower half of the potential ridge being a result of the inherent polarity-reversing operation of the operational-amplifier. If desired, the upper half of the potential ridge may be used, by utilizing a search waveform that moves the electron beam downward from a quiescent location at the top of the storage element, and by utilizing an inverter between the operational-amplifier and the deflection system.

It will be recalled that during the search mode of operation, the signal from waveform-generator 26 is applied to the deflection system 12; while during the lock-on mode of operation, the signal from the operational-amplifier 38 is applied to the deflection system 12. Specifically, during the search mode of operation, only the search waveform is produced; the signal from readout gate 36 being absent because no primary signal is applied to it, and the signal from reference gate 30 being absent because of the negative gating signal from flip-flop 24. Similarly, during the lock-on mode of operation, a signal is obtained from operational amplifier 38; the search waveform from waveform generator 26 being absent because of the presence of a storage tube output signal applied to inverter 20. Thus, the two signals applied to the deflection circuit 12 are mutually-exclusive; that is, only one can exist at any given time, and this one is applied to the deflection system 12.

It should be noted that, due to the high gain of the operational-amplifier, the positioning voltage increases very rapidly when the electron beam strays from the selected +4-volt level; although if the electron beam should happen to cross the +4-volt level on the upper half of the potential ridge, the operation would be such as to deflect the electron beam further upwards, and away from the potential ridge. At this time the electron beam would "lose" the potential ridge, and the output signal from the storage-tube would drop to zero. As a result, circuits 30 and 36 would be disabled, circuit 16 would be enabled, and the search mode would be initiated. Under this condition, the electron beam does not return to its quiescent position at the lower left-hand corner of the storage element; instead, it moves directly downward—due to the fact that (1) the operational-amplifier has a zero error voltage, and (2) that the horizontal sweep generator is producing a horizontal deflecting voltage that has a finite, rather than a zero, value. Thus, the search waveform 28 initiates an upward-and-to-the-right search pattern from that position.

*The readout mode*

The readout mode of stored information is achieved as follows, it being recalled that the electron beam locks onto the +4-volt level of the potential ridge, and that horizontal sweep generator 22 is operating. Once lock-on has been achieved, the horizontal deflection signal from the horizontal sweep generator 22 causes the electron beam to move horizontally. If the potential ridge happens to be horizontal at this location, the horizontally-moving electron beam moves along the +4-volt level of the potential ridge; and the zero-voltage positioning signal from operational-amplifier 38 indicates continuously that the value of the stored information is remaining constant, at zero volts. It should be noted that the continuous zero-voltage positioning signal from the operational-amplifier is an analog signal that indicates the constant zero-value of the stored pattern, as represented by a straight horizontal portion of the potential ridge.

If the potential ridge should curve upward or downward, depending upon the stored information, the horizontally-moving electron beam will descend or climb up the side of the potential ridge; and an error signal would be produced as previously described. The operational-amplifier 38 will respond to the error signal, and deflect the electron beam vertically to restore it to the +4-volt level. In this way the electron beam will follow the +4-volt level of the stored-information potential ridge.

The output of the operational-amplifier indicates the value of the stored-information potential ridge in the following manner. Assume that the potential ridge—when it was found—happened to be two-units above the previously discussed zero position of the storage element; that is, the two-unit location of the stored pattern represents two volts of input signal, rather than the zero-volt input signal of the previous example. Assume further that the electron beam happened to stop at the +3.995-volt level. As previously explained, the operational amplifier sees a −.005-volt (+3.995−4.000) error voltage, and produces a positive positioning voltage that moves the electron beam upwards. For convenience of explanation, assume that each .001 volt of the error voltage produces a 1-volt positioning signal, and that the −.005 error voltage causes the operational amplifier to produce a +5-volt positioning voltage that—when applied to the vertical portion of the deflection system—would cause the electron beam to move upward to a position that is five units above the zero position of the storage element. However, as the electron beam tries to leave its position on the potential ridge, in order to move upward to the five-unit position, it has to climb higher on the potential ridge, and therefore reaches the +3.996-volt level of the potential ridge. This reduces the error signal to −.004 volt, which results in a +4-volt positioning voltage applied to the deflection system. Now as the electron beam tries to leave the +3.996-volt level of the potential ridge in order to move upward to the four-unit position of the storage surface, it has to climb higher on the potential ridge, and therefore reaches the +3.997-volt level. This procedure is continuously repeated, until the electron beam reaches the +3.998-volt level of the potential ridge, resulting in a 2-volt positioning signal applied to the deflection system. At this time the 2-volt positioning voltage is such as to position the electron beam at the two-unit position of the storage element; but it is already there—actually at the +3.998-volt level of the potential ridge—which is an infinitesimal distance below the spine of the potential ridge that is at the two-unit position of the storage element. If the electron beam should happen to overshoot the +3.998-volt level, and reach the +3.999-volt level of the potential ridge, the resultant error voltage would be (+3.999−4.000), or −.001 volt. This −.001 error voltage would cause the operational amplifier to produce a positioning voltage of +1 volt, which would deflect the electron beam downward. During its downward movement, the electron beam would ride down the potential ridge to the +3.998-volt level, at which time a 2-volt positioning voltage would be developed as explained above. Thus, when the potential ridge is positioned at the two-unit location, the electron beam is locked to the 3.998-volt level of the potential ridge, just .002 volt below the selected 4-volt level; the 2-volt positioning voltage from the operational amplifier being the analog readout of the stored information as represented by the potential ridge at the two-unit location of the storage element.

An analysis similar to that presented above will show that when the potential ridge is at the seven-unit position of the storage element, the electron beam will come to rest at the +3.993-volt level of the potential ridge; the .007-volt error voltage causing the output of the operational amplifier to be +7 volts—an analog readout of the stored information as represented by the potential ridge at the seven-unit location of the storage element.

Thus, the output positioning-voltage signal from operational amplifier 38 is the desired analog readout, and is available at the output terminal 42 of the operational amplifier.

While the foregoing operation was presented in terms of separate step-by-step operations, it will be realized that in actuality the operation is a series of high-speed incremental movements that produce substantially instantaneous lock-on and readout. It will be further realized that the foregoing explanation used a 1000:1 ratio, that is, a .001-volt error voltage caused the operational amplifier to produce a 1-volt positioning voltage; whereas in actuality the ratio of operational amplifier output-to-input may be considerably greater than 1000 to 1, this resulting in an extremely fast lock-on and readout.

The operation of the disclosed circuit may be summarized in another, less technical manner as follows. Despite the fact that the stored information—operating through readout gate 36—is always trying to change the potential at point 34, operational amplifier 38 maintains a constant voltage at point 34. The effort involved in maintaining this constant potential appears at the output of the operational amplifier, this output being an analog readout of the stored information.

*Information storage*

When it is desired to store new information in storage tube 10, the read signal is terminated, thus disabling gates 16, 30, and 36, so that no positioning signal is produced. An erase-circuit 44, providing the signals designated by the storage tube's manufacturer, is activated to flood the storage element, and thus erase the previously stored information. At this time a writing-circuit 46, providing the signals designated by the storage tube's manufacturer, is activated to write in the new information to be stored on the storage element. The storage tube is now ready for readout, as described above.

It should be noted that readout gate 36 is not essential to the operation of the circuit. For example, during the search mode there is no output from storage tube 12; and therefore no primary signal for gate 36. Thus, if gate 36 were replaced with a straight-through connection, no signal would be applied to summation point 34 during the search mode; the same result as is achieved by gate 36. During the lock-on mode of operation, the straight-through connection would apply the primary signal to summation point 34; the same result as is achieved by gate 36. The advantage of using gate 36 and its read gating signal, is that during the erase and writing modes there may be spurious outputs from storage tube 12, and the disclosed gate circuit prevents these spurious signals from reaching the operational amplifier 38; although this same result can be obtained by biassing off the storage tube output terminal 14.

It should also be noted that starting gate 16 is also not essential to the operation of the circuit. For example, during the search mode, when there is no output from the storage tube 10, inverter 20 produces a signal that may be used to set flip-flop 24—which then operates in the described manner, and may activate the horizontal-sweep-generator 22. During the lock-on mode of operation, inverter 20 does not produce any output signal; and flip-flop 24 may then revert to its initial state. The advantage of using starting gate 16 is that the absence of the read signal disables the circuitry, and immunizes the system against spurious storage tube output signals during the erase and write modes of operation.

Figure 3:
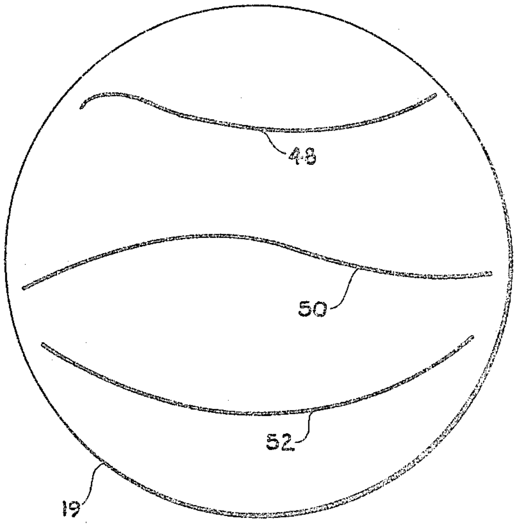
FIG. 3 illustrates a multiple storage of analog information.

FIG. 3 symbolizes a storage element 19 having thereon a plurality of stored-information potential ridges 48, 50, and 52. The disclosed apparatus may be operated in such a manner as to search for, find, and read out any desired potential ridge of the plurality. This result is achieved as follows. It is known that each ridge is in a given zone; and the quiescent location of the electron beam is therefore selected, by the use of suitable deflection voltages, to be at the bottom of that zone. Thus, when the electron beam starts its upward search movement, it cannot impinge onto a potential ridge below the selected zone, and will lock onto the desired potential ridge before the electron beam leaves the selected zone to enter the zone above the selected zone. In this way, a selected stored pattern may be read out; despite the presence of a plurality of stored potential ridges. It should be noted that once the electron beam has locked-onto the desired potential ridge, it will follow that ridge, as explained above, throughout all of that ridge's convolutions—as long as that ridge does not intersect with another potential ridge.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. In a storage and readout system wherein the storage comprises a potential gradient having a given voltage-level line, and the readout comprises an electron beam, the combination comprising:
   - a reference voltage;
   - means for obtaining the potential at the point of electron beam impingement on said potential gradient;
   - means for comparing said potential and said reference voltage, and producing an error voltage;
   - an operational amplifier;
   - means for applying said error voltage to said operational amplifier; and
   - means for causing the output of said operational amplifier to deflect said electron beam.

2. In a storage and readout system wherein the storage is in the form of a potential ridge in a storage tube, said potential ridge having a given voltage-level line, and the readout comprises an electron beam, the combination comprising:
   - a reference voltage equal in magnitude and opposite in polarity to said given voltage-level;
   - means for obtaining the potential at the point of electron beam impingement on said potential ridge;
   - means for comparing said potential and said reference voltage, and producing an error voltage;
   - an operational amplifier;
   - means for applying said error voltage to said operational amplifier; and
   - means for causing the output of said operational amplifier to cause said electron beam to lock on to said given voltage-level-line of said potential ridge.

3. In a storage and readout system wherein the storage is a potential ridge in a storage tube, said potential ridge having a given voltage-level line, and the readout comprises an electron beam, the combination comprising:
   - a reference voltage equal in magnitude and opposite to polarity to said given voltage-level;
   - means for obtaining the potential at the point of electron beam impingement on said potential ridge;
   - means for comparing said potential and said reference voltage, and producing an error voltage;
   - an operational amplifier;
   - means for applying said error voltage to said operational amplifier to provide an output of said operational amplifier as a positioning voltage;
   - means for applying said positioning voltage to the deflection system of said storage tube to cause said electron beam to lock onto said given voltage-level line of said potential ridge; and
   - means for causing said positioning voltage to provide information about said potential ridge.

4. In a storage and readout system wherein the storage comprises a potential ridge having a given voltage-level line, and the readout comprises an electron beam, the combination comprising:
   - means for producing a search-waveform;
   - means for causing said search-waveform to deflect said electron beam in a search mode;
   - a reference voltage;
   - means for obtaining the potential at the point of electron beam impingement on said potential ridge;
   - means for causing said potential to terminate said search mode;
   - means for comparing said potential and said reference voltage, and producing an error voltage;
   - an operational amplifier;
   - means for applying said error voltage to said operational amplifier; and
   - means for causing the output of said operational amplifier to deflect said electron beam.

5. In a storage and readout system wherein the storage comprises a potential ridge having a given voltage-level line, and the readout comprises an electron beam, the combination comprising:
   - (A) means for obtaining the potential at the point of electron beam impingement on said potential ridge;
   - (B) means for causing said system to operate in a search mode, said means comprising:
     - a flip-flop circuit;
     - means for causing the absence of said potential to set said flip-flop to a first state;
     - means for producing a search-waveform;
     - means for causing said first state of said flip-flop to activate said search-waveform-producing means;
   - means for causing said search-waveform to deflect said electron beam in a search mode;
     - means for causing the presence of said potential to set said flip-flop to a second state;
     - means for causing said second state of said flip-flop to deactivate said search-waveform-producing means—whereby said search mode is terminated;

(C) means for causing said system to operate in a lock-on mode, said means comprising:

a reference voltage;

means for comparing said potential and said reference voltage, and producing an error voltage;

an operational amplifier;

means for applying said error voltage to said operational amplifier; and means for causing the output of said operational amplifier to deflect said electron beam.

6. In a storage and readout system wherein the storage is in the form of potential ridge in a storage tube, said storage having a deflection system, said potential ridge having a given voltage-level line, and the readout comprises an electron beam, the combination comprising:

(A) means for obtaining the potential at the point of electron beam impingement on said potential ridge;

(B) means for causing said system to operate in a search mode said means comprising:

an inverter circuit;

means for applying output of said storage tube to said inverter;

a flip-flop circuit;

means for applying the output of said inverter to said flip-flop to cause the absence of said potential to set said flip-flop to a first state;

means for producing a search-waveform;

means for causing said first state of flip-flop to activate said search-waveform-producing means;

means for causing said search-waveform to deflect said electron beam in a search mode;

means for causing the presence of said potential to cause said inverter to set said flip-flop to a second state;

means for causing said second state of said flip-flop to deactivate said search-waveform-producing means—whereby said search mode is terminated;

(C) means for causing said system to operate in a lock-on mode, said means comprising:

a reference voltage equal in magnitude and opposite in polarity to said given voltage-level;

means for comparing said potential and said reference voltage, and producing an error voltage;

an operational amplifier;

means for applying said error voltage to said operational amplifier; and means for causing the output of said operational amplifier to cause said electron beam to lock-on to said given voltage-level line of said potential ridge.

7. In a storage and readout system wherein the storage is in the form of a potential ridge in a storage tube, said potential ridge having a given voltage-level line, and the readout comprises an electron beam, the combination comprising:

(A) means for obtaining the potential at the point of electron beam impingement on said potential ridge;

(B) means for causing said system to operate in a search mode, said means comprising:

a flip-flop circuit;

means for causing said potential to control the state of said flip-flop;

means for causing one state of said flip-flop to initiate said search mode;

means for causing a second state of said flip-flop to terminate said search mode;

(C) means for causing said system to operate in a lock-on mode, said means comprising:

a summation point;

means for applying the output of said storage tube to said summation point;

a reference voltage;

a reference gate;

means for causing the second state of said flip-flop to cause said reference gate to transmit said reference voltage to said summation point, the output of said storage tube and said reference voltage producing an error voltage at said summation point;

an operational amplifier;

means for applying said error voltage to said operational amplifier; and means for causing the output of said operational amplifier to cause said electron beam to lock-on to said given voltage-level line of said potential ridge.

8. In a storage and readout system wherein the storage is in the form of a potential ridge in a storage tube, said potential ridge having a given voltage-level line, and the readout comprises an electron beam, the combination comprising:

(A) means for obtaining the potential at the point of electron beam impingement on said potential ridge;

(B) means for causing said system to operate in a search mode, said means comprising:

a flip-flop circuit;

means for causing the absence of said potential to set said flip-flop to a first state;

means for producing a search-waveform;

means for causing said first state of said flip-flop to activate said search-waveform-producing means;

means for causing said search-waveform to deflect said electron beam in a search mode;

means for causing the presence of said potential to set said flip-flop to a second state;

means for causing said second state of said flip-flop to deactivate said search-waveform-producing means—whereby said search mode is terminated;

(C) means for causing said system to operate in a lock-on mode, said means comprising:

a summation point;

means for applying the output of said storage tube to said summation point;

a reference voltage;

a reference gate;

means for causing the second state of said flip-flop to cause said reference gate to transmit said reference voltage to said summation point, the output of said storage tube and said reference voltage producing an error voltage at said summation point;

an operational amplifier;

means for applying said error voltage to said operational amplifier; and means for causing the output of said operational amplifier to cause said electron beam to lock on to said given voltage-level line of said potential ridge.

9. In a storage and readout system wherein the storage is in the form of a potential ridge in a storage tube, said potential has a given voltage-level line, and the readout comprises an electron beam, the combination comprising:

(A) means for obtaining the potential at the point of electron beam impingement on said potential ridge;

(B) means for causing said system to operate in a search mode, said means comprising:

a flip-flop circuit;

means for causing the absence of said potential to set said flip-flop to a first state;

means for producing a search-waveform;

means for causing said first state of said flip-flop to activate said search-waveform-producing means;

means for causing said search-waveform to deflect said electron beam in a search mode;

means for causing the presence of said potential to set said flip-flop to a second state;

means for causing said second state of said flip-flop to deactivate said search-waveform-producing means—whereby said search mode is terminated;

(C) means for causing said system to operate in a lock-on mode, said means comprising:

a summation point;

means for applying the output of said storage tube to said summation point; a reference voltage;

a reference gate;

means for causing the second state of said flip-flop to cause said reference gate to transmit said reference voltage to said summation point, the output of said storage tube and said reference voltage producing an error voltage at said summation point;

an operational amplifier;

means for applying said error voltage to said operational amplifier;

means for causing the output of said operational amplifier to cause said electron beam to lock on to said given voltage-level line of said potential ridge;

an erase circuit;

means for applying the output of said erase circuit to said storage tube;

a write circuit; and means for applying the output of said write circuit to said storage tube to provide stored information in the form of a potential ridge.

10. In an electron beam storage tube having a potentian gradient stored on a storage element thereof, readout apparatus comprising:

means for selecting a predetermined potential between the maximum and minimum of said potential gradient; and means for causing the electron beam of said storage tube to sweep said storage element in a pattern defined by points substantially at said predetermined potential.

11. In combination with a storage tube having an electron gun for producing an electron beam and a storage element for storing a pattern of charge potentials, means for selecting a charge potential less than the maximum of said stored charge potentials;

means for sensing deviation from said selected potential, of the potential at a point of impingement of said electron beam; and means for controlling the deflection of the beam to reduce said deviation.

12. In combination with a storage tube having an electron gun for producing an electron beam and a storage element for storing a pattern of charge potentials, means for selecting a charge potential less than the maximum of said stored charge potentials;

means for sensing deviation from said selected potential of the potential at a point of impingement of said electron beam;

means for generating a deflection signal having a magnitude linearly related to said deviation;

means responsive to the deflection signal for controlling the deflection of the beam to reduce said deviation; and output means responsive to the deflection signal.

No references cited.

ARTHUR GAUSS, *Primary Examiner.*

J. JORDAN, *Assistant Examiner.*